3,072,505
METHOD FOR THE SURFACE OXIDATION OF PULVERIZED IRON
Kanzo Yamazaki, Toyono-machi, Kami-Minochigun, Japan, assignor to Hokuriku Kako Kabushiki Kaisha, Tokyo, Japan, a corporation of Japan
No Drawing. Filed Jan. 4, 1960, Ser. No. 49
4 Claims. (Cl. 148—6.14)

The present invention relates to a process for the surface oxidation of pulverized iron, and particularly such a process wherein the pulverized iron is first mixed with an aqueous solution of an organic acid having a relatively low evaporating temperature and the resulting mixture is heated to perfectly evaporate the organic acid included.

The present invention is characterized in that a necessary quantity of aqueous organic acid solution of an appropriate concentration, such as oxalic, formic or acetic acid evaporating at a relatively low temperature (below 350° C.) is uniformly mixed with iron powders to be oxidized on the surfaces thereof and thereafter the resulting mixture is heated at a temperature above the evaporation point and below 350° C. This is done with the object of producing, in abundance and at low cost, a good electric insulating pulverized iron with the grain surfaces thereof covered only with iron oxide and without any acid radical.

Hitherto, in using a pulverized iron flux in welding rods of the pulverized iron series, it has been usual practice for obtaining a high electrical insulation after painting, to cover the surfaces of pulverized iron with iron oxide. However, all usual methods have been so-called wet methods wherein iron powder is submitted to oxidation in an aqueous solution. Accordingly, there are various disadvantages in those methods as follows: Namely, (1) the time required is long, and the loss of pulverized iron due to solution is large. (2) The loss of pulverized iron due to this complicated operation is large. (3) Because the control of surface oxidation can not be effected freely and sufficient oxidation can not be attained, accordingly the control of electric insulation can not be freely performed and the insulating property is not good. (4) A neutralizing operation is required, because acid radicals remain in the pulverized iron after treatment. (5) Because it is feared that iron oxide coatings may peel off when dried, a binder is sometimes used. (6) The electrical insulating property is not good, notwithstanding the fact that a decrease of metallic iron is obtained due to the oxidation.

According to the present invention, an organic acid is dissolved in water to produce a solution in an amount required to form an iron oxide coating upon the grains of iron powder to impart thereto a required electric insulation. The organic acid employed is preferably oxalic, formic or acetic acid, which evaporates at a relatively low temperature (below 350° C.). The resulting solution is added to the iron powder and thoroughly mixed therewith. The mixture is then heated at a temperature above the evaporating temperature of said organic acid and below 350° C. to evaporate the organic acid and simultaneously oxidize the surfaces of the pulverized iron. The stated operation is remarkably simple and the necessary time of treatment is short.

The above-mentioned oxidation covers a series of reactions such as a slight corrosion occurring on the surfaces of the pulverized iron when the pulverized iron is mixed with the aqueous organic acid solution, an oxidation due to the coexistence of the organic acid and steam when the iron is dried under heating, and a completion of oxidation after the evaporation and decomposition of the organic acid due to drying and heating, all of which can be effected in a very short interval of time. Accordingly, pulverized iron coated with iron oxide of a high electric insulation can be obtained. Therefore, various advantages can be obtained as follows: Namely, (1) the time for treatment is short and substantially no loss due to dissolution occurs. (2) Substantially no loss of iron occurs in the course of treatment, because of the operation being simple. (3) As the degree of oxidation can be freely controlled by changing the amount of organic acid used as well as other factors, the control of electric insulation can also be effected freely and a desired insulation can be obtained over a wide range. (4) As the organic acid can be completely evaporated during the treatment, no acid radicals remain, and thus no after-neutralization is needed. (5) The oxidation finishes at the final period of heating, and a strong iron oxide coating or film is obtained by a low temperature sintering. As a result, no binder or the like is needed. (6) Since the critical temperature for heat treatment is a temperature where the pulverized iron having been submitted to oxidation according to the invention is subject to substantially no alteration of its properties, when it is placed in air as it is, the heating at a temperature below that for a short period of time will result in an extraordinarily satisfactory relation between the loss of metallic iron and electric insulation as compared with usual methods.

Thus, according to the process of this invention a pulverized iron of a high grade metallic iron and a good electric insulation for fluxes of welding rods of the iron powder series can be produced, which could not be produced heretofore by a very simple operation, at a low cost and in mass production.

In the following, the comparison between the insulating iron powders manufactured by usual processes and those produced according to the present process is given by way of example. The insulating iron powders manufactured by the usual process contain total Fe 87.84% and metallic Fe 74.15%, while those manufactured by the process of this invention contain total Fe 96.92% and metallic Fe 94.62%. Their electric insulation was determined by comparing the amperage measured on the pulverized iron packed under stationary load of 12 kg./cm.$^2$ in a space between a pair of parallel plate poles, by means of an electric insulation tester of the polar plate aperture of 3 mm., when D.C. of 110 v. is passed through said pulverized iron specimen. The current passing through the specimen prepared by the usual process was 26 ma. and did not satisfy the insulation test for a coated welding rod, and that prepared by the present process was 6 ma. and passed perfectly the coated rod test.

In this case, when the current passed is measured by the process in the said insulation tester, the pulverized iron showning an insulation value above 20 ma. was generally unsatisfactory in the insulation test of the welding rod after coated therewith, and also those having an insulation value below 30 ma. were passed through said test.

Examples of this invention are given below.

Example 1

35 kgs. of 100 mesh pulverized from (total Fe 98.21%; metallic Fe 96.84%) was taken, to which were added 5 liters of 3% aqueous oxalic acid solution, and the resulting mixture was mixed and then kneaded together. The thus obtained kneaded mixture was transferred to a heating receptacle and heated up to 250° C. while being stirred, and then kept at the same temperature, for about 10 minutes. Thereafter the mixture was drawn out in a cooling tank and thus 35 kgs. of oxide coated insulated pulverized iron (the total Fe 96.92%, metallic Fe 94.62%) was obtained. The results of the insulation test on said insulated pulverized iron were as follows. The amperage as obtained by passing D.C. current at 110 v. through the pulverized iron packed in an aperture 3 mm. between the polar plates under a stationary load of 12 kg./cm.$^2$ was 6 ma.

*Example 2*

35 kgs. of 100 mesh pulverized iron (total Fe 98.21%; metallic Fe 96.48%) was taken, to which were added 5 liters of 4% aqueous oxalic acid solution, and the resulting mixture was mixed and then kneaded together. The thus obtained kneaded mixture was transferred to a heating receptacle and heated up to 250° C., while being stirred, and then kept at the same temperature for about 15 minutes. Thereafter the mixture was drawn out in a cooling tank, and thus 35 kgs. of oxide coated insulated pulverized iron (the total Fe 96.64%; metallic Fe 92.08%) was obtained. Then, the insulation test was conducted on said insulated pulverized iron as in Example 1. The amperage obtained was 0.8 ma.

*Example 3*

35 kgs. of 100 mesh pulverized iron (total Fe 98.21%; metallic Fe 96.48%) was taken, to which were added 5 liters of 5% aqueous oxalic acid solution, and the resulting mixture was mixed and then kneaded together. The thus obtained kneaded mixture was transferred to a heating receptacle and heated up to 250° C., while being stirred, and then kept at the same temperature for about 15 minutes. Thereafter the mixture was drawn out in a cooling tank, and thus 35 kgs. of oxide coated insulated pulverized iron (total Fe 95.74%; metallic Fe 90.62%) was obtained. Then, the insulation test was conducted on said insulated pulverized iron as in Example 1. The amperage obtained was 0.09 ma.

*Example 4*

35 kgs. of 100 mesh pulverized iron ( total Fe 98.21%; metallic Fe 96.48%) was taken, to which were added 5 liters of 5% aqueous formic acid solution, and the resulting mixture was mixed and then kneaded together. The thus obtained kneaded mixture was transferred to a heating receptacle and heated up to 250° C., while being stirred, and then kept at the same temperature for about 15 minutes. Thereafter the mixture was drawn out in a cooling tank, and thus 35 kgs. of oxide coated insulated pulverized iron (total Fe 95.83%; metallic Fe 90.76%) were obtained. Then, the insulation test was conducted on said insulated pulverized iron as in Example 1. The amperage obtained was 1.2 ma.

*Example 5*

35 kgs. of 100 mesh pulverized iron (total Fe 98.21%; metallic Fe 96.48%) was taken, to which were added 5 liters of 5% aqueous acetic acid solution, and the resulting mixture was mixed and then kneaded together. The thus obtained kneaded mixture was transferred to a heating receptacle and heated up to 250° C., while being stirred, and then kept at the same temperature for about 20 minutes. Thereafter the mixture was drawn out in a cooling tank, and thus 35 kgs. of oxide coated insulated pulverized iron (total Fe 95.41%; metallic Fe 89.80%) was obtained. Then, the insulation test was conducted on said insulated pulverized iron as in Example 1. The amperage obtained was 1.5 ma.

With organic acids other than above-mentioned, such as tartaric acid, lactic acid etc., similar effects can be obtained.

What I claim:

1. A process for producing pulverized iron of high electric insulation properties having surfaces coated only with iron oxide comprising adding to pulverized iron a 3% to 5% aqueous solution of an organic acid selected from the group consisting of oxalic, formic and acetic acids which evaporates at a temperature below 350° C., thoroughly mixing the pulverized iron and said solution, and while stirring the mixture evaporating said solution at a temperature between the evaporation temperature of the organic acid and 350° C.

2. A process for producing pulverized iron of high electric insulation properties having surfaces coated only with iron oxide comprising adding to pulverized iron a 3% to 5% aqueous solution of an organic acid selected from the group consisting of oxalic, formic and acetic acids which evaporates at a temperature below 350° C., thoroughly mixing the pulverized iron and said solution, heating the pulverized iron and said solution to a temperature between the evaporation temperature of the organic acid and 350° C. during mixing, and maintaining the same temperature for 10 to 15 minutes to evaporate said solution and dry the iron.

3. A process for producing pulverized iron of high electric insulation properties having surfaces coated only with iron oxide comprising adding to pulverized iron a 3% aqueous solution of oxalic acid, thoroughly mixing the pulverized iron and said solution, heating the mixture to 250° C., stirring the mixture while so heated, and then maintaining the mixture at the same temperature for 10 minutes to complete the evaporation of said solution and dry the iron.

4. A process for producing pulverized iron of high electric insulation properties having surfaces coated only with iron oxide comprising adding to 100 mesh pulverized iron a 3% to 5% aqueous solution of oxalic acid in the proportion of substantially 35 kgs. of the iron to 5 liters of the solution, mixing the iron and solution, kneading the mixture to obtain thorough mixture of all iron particles with the mixture, stirring the kneaded mixture, heating the mixture to 250° C. while being stirred, and maintaining the mixture at the same temperature for 10 to 15 minutes to evaporate said solution and dry the iron.

References Cited in the file of this patent

UNITED STATES PATENTS

| | | |
|---|---|---|
| 1,274,952 | Speed | Aug. 6, 1918 |
| 1,383,703 | Elmen | July 5, 1921 |
| 1,911,537 | Tanner | May 30, 1933 |
| 2,273,234 | Tanner | Feb. 17, 1942 |
| 2,674,553 | Schnitzler | Apr. 6, 1954 |

FOREIGN PATENTS

| | | |
|---|---|---|
| 766,552 | Great Britain | Jan. 23, 1957 |